United States Patent Office
3,011,828
Patented Dec. 5, 1961

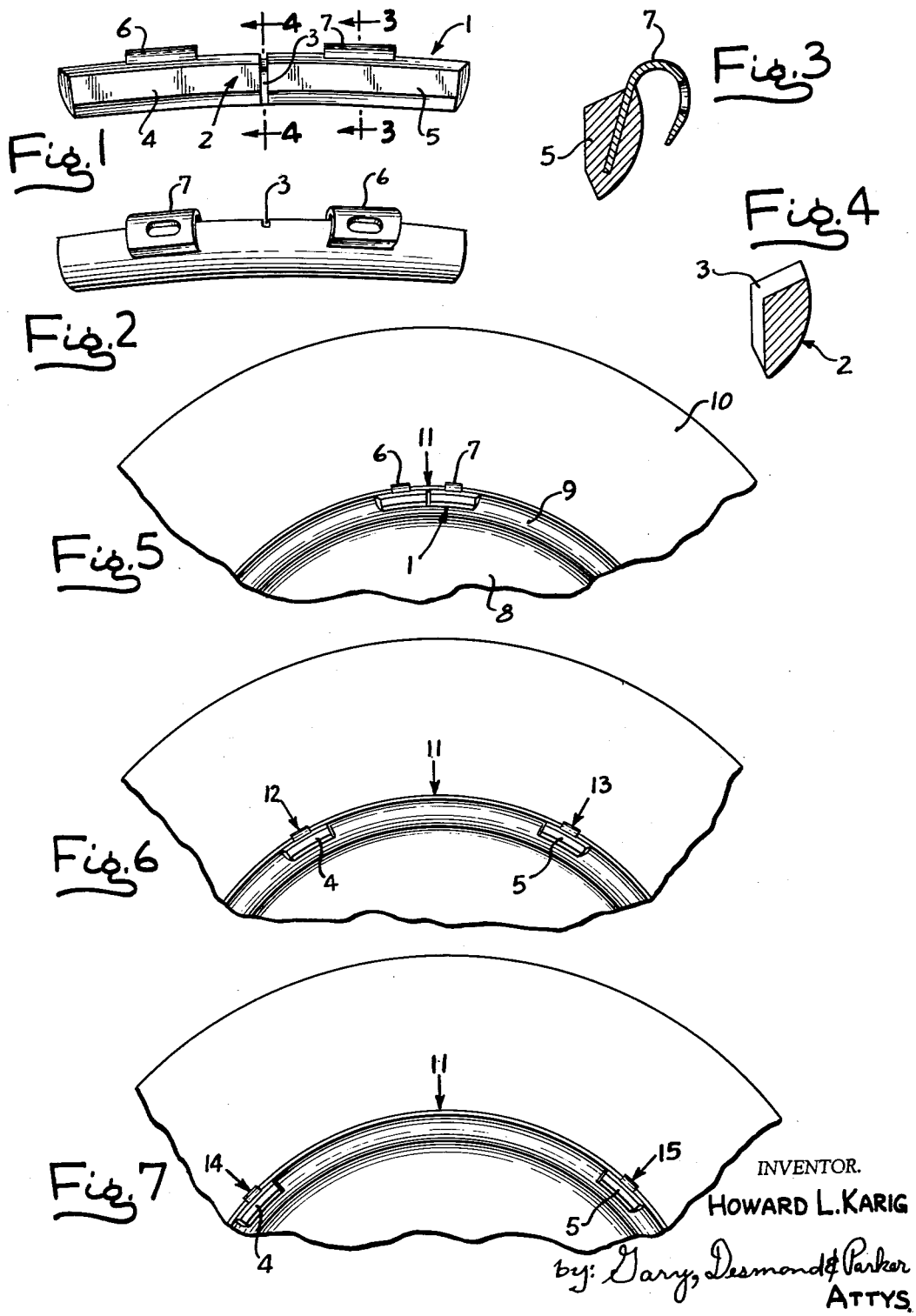

3,011,828
BALANCE WEIGHT FOR AUTOMOTIVE
WHEELS
Howard L. Karig, 134 Fellows Court, Elmhurst, Ill.
Filed Apr. 22, 1959, Ser. No. 808,228
1 Claim. (Cl. 301—5)

This invention relates to improvements in balancing weights for mounting on the wheels of automotive vehicles to correct the static and dynamic balance thereof, and refers particularly to a unitary weight which is so formed that the weight or parts thereof may be employed to correct a large number of unbalance conditions.

In view of the fact that many wheels unbalance conditions are likely to be encountered, a service station, garage or the like has heretofore been compelled to stock unmerous weights to cover all conditions. This, of course, necessitates that the service station, garage or the like carry a relatively large inventory of different weights. In addition, the manufacturer of the weights must employ molds suitable for molding the various size weights which increases the cost of the weights.

The present invention resides in the provision of a unitary weight so proportioned and so constructed that a single size weight per se or parts thereof may be used to cover a plurality of unbalanced conditions. This reduces the inventory of the service station, garage or the like, and also reduces the cost of manufacture of the weights since only a single mold is necessary to produce a given style weight and a single inventor is maintained by the manufacturer.

Briefly described, the weight comprising the present invention comprises a unitary arcuate weight having a line of weakness provided substantially centrally of its length so that the weight may be broken or severed to divide the weight into two substantially equal halves, the basic or original weight carrying two spaced clips which are so disposed that when the basic weight is centrally severed, each component weight will carry one clip disposed substantially centrally of said component.

The objects and advantages will be more apparent from the accompanying drawing and following detailed description.

In the drawing,

FIG. 1 is a front elevational view of a balance weight embodying the concept of the present invention.

FIG. 2 is a rear elevational view of the weight shown in FIG. 1.

FIG. 3 is an enlarged sectional view taken on line 3—3 of FIG. 1.

FIG. 4 is an enlarged sectional view taken on line 4—4 of FIG. 1.

FIG. 5 is a fragmentary elevational view of an automobile wheel and tire carrying one of the integral basic weights.

FIG. 6 is a view similar to FIG. 5 showing the component or half weights applied to the wheel to correct a different unbalance condition.

FIG. 7 is a similar view wherein the two half weights are applied to the wheel to correct another different unbalance condition.

Referring in detail to the drawing, 1 indicates the basic weight comprising the present invention. The weight 1 comprises an elongated mass of metal 2, preferably lead, which is arcuate so as to conform substantially to an arcuate automobile rim.

As a feature of the invention the mass 2 is provided centrally with a line of weakness 3 whereby the basic mass 2 may be conveniently severed into two component weights 4 and 5. It is of importance that the basic mass 2 be divided into two parts of as equal weight as possible.

It is desirable, particularly where the basic mass 2 is relatively elongated to employ two attaching clips 6 and 7 so that the weight can be securely fastened to the rim, and as a feature of the invention each of the clips is centrally positioned upon the component weights 4 and 5. The clips 6 and 7 are similar and are intended to add equal weight to each component so that the resultant units will be substantially equal in total weight.

The clips 6 and 7 are, in themselves, of conventional construction and have a portion thereof embedded in the mass in a conventional manner, as shown best in FIG. 3.

In the use of the present invention the basic weight 1 may be used in its unitary form, as shown best in FIG. 5, wherein the reference numeral 8 constitutes the automobile wheel which is assumed to be out of balance; 9 indicates a conventional rim, 10 indicates the automobile tire, and 11 indicates the point on the rim 9 diametrically opposite the focal point of the forces producing unbalance. This use of the weight together with its angular positioning at point 11, will correct a predetermined unbalanced condition of the wheel. In the event that the amount of unbalance is less than the weight of the basic unit to be applied to the point 11, the basic weight may be severed into equal weight components 4 and 5 and the components may be positioned at points 12 and 13 which are equally spaced angularly from point 11, as shown in FIG. 6. The effect of the weight components 4 and 5 is to produce a resultant at point 11 which is equivalent in weight to the mass producing unbalance of the wheel.

By increasing the equal angular spacings of the components from the point of counter-balances 11, as at points 14 and 15 in FIG. 7, the resultant may be reduced in effective weight value. By positioning the components 4 and 5 closer to the point of counter-balance 11, the effect of the total basic weight may be more closely approximated.

Thus by positioning the weight components 4 and 5 at different positions equal circumferential distances to opposite sides of the point of counter-balance, weight resultants at the point of counter-balance may be selected almost infinitely between zero (when the components are each spaced 90 degrees from the point 11) and the total weight of the basic weight 1 (when the basic weight is placed at point 11).

The invention presents further advantages. For instance, if a basic weight applied at the point 11 were not sufficient to counter-balance the unbalanced forces, additional weights could be applied as described to extend the effective coverage of unbalance conditions infinitely within the total range from zero to two or more times the mass of the basic weight.

Hence, a service station, garage or the like, by stocking only a single size of basic types of weights can correct substantially all unbalance conditions met with in practice. By virtue of the fact that the components 4 and 5 are of equal weight, the symmetrical positioning of the components about the point of counter-balance assists the operator in establishing a desired infinitely variable resultant at said point. In addition, in continuously dealing with components of equal weight and, hence, of symmetrical distribution, the operator soon acquires a high degree of skill and judgment in arriving at the value of a desired resultant in terms of angular spacing of the components about the point of unbalance.

I claim as my invention:

A balance weight for balancing automotive wheels, which consists of an arcuate elongated mass of metal of uniform cross-section throughout its length, said mass being provided with a single transverse line of weakness centrally of its length whereby said mass can be severed into two similar components of equal weight, and a pair of spring clips of equal weight having portions embedded in said mass and portions extending outwardly therefrom for securement to an automotive wheel rim, each spring clip being disposed centrally of the length of a respective component, the weight being applicable by said clips to the wheel rim to produce at a point thereon a counter-balancing force equal to and diametrically opposite the focal point of the forces causing the wheel to be unbalanced, said components being severable and movable along said rim equal circumferential distances to opposite sides of the point of counter-balance to produce at said point a resultant counter-balancing mass infinitely variable between zero and the total weight of said mass of metal and said clips.

References Cited in the file of this patent

UNITED STATES PATENTS

| | | |
|---|---|---|
| D. 161,006 | Dailey | Nov. 28, 1950 |
| 1,997,825 | Hume | Apr. 16, 1935 |
| 2,459,568 | Lyon | Jan. 18, 1949 |
| 2,485,936 | Stroberg | Oct. 25, 1949 |
| 2,640,727 | Kennedy | June 2, 1953 |
| 2,714,039 | Pouell | July 26, 1955 |